(12) United States Patent
Vonnegut et al.

(10) Patent No.: US 6,484,857 B2
(45) Date of Patent: Nov. 26, 2002

(54) TORQUE TRANSFER CLUTCH WITH BALL SCREW ACTUATOR

(75) Inventors: Carl H. Vonnegut, Newton, MA (US); Mozaffar Khazaee, Baldwinville, NY (US); Sankar K. Mohan, DeWitt, NY (US); Eric A. Bansbach, Fayetteville, NY (US); Daniel J. Miller, Fayetteville, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/775,089

(22) Filed: Feb. 1, 2001

(65) Prior Publication Data
US 2002/0100657 A1 Aug. 1, 2002

(51) Int. Cl.[7] .............................................. F16H 37/06
(52) U.S. Cl. ........................... 192/35; 192/92; 192/84.6
(58) Field of Search ....................... 192/35, 94, 84.6; 180/233, 248, 249, 250

(56) References Cited

U.S. PATENT DOCUMENTS

| | | | |
|---|---|---|---|
| 2,091,268 A | * | 8/1937 | Colman .................. 192/111 R |
| 3,178,958 A | | 4/1965 | Beck |
| 3,507,374 A | * | 4/1970 | Allaben, Jr. ............... 192/84.7 |
| 4,590,816 A | | 5/1986 | Weyer |
| 4,635,904 A | | 1/1987 | Whittingham |
| 4,718,303 A | | 1/1988 | Fogelberg |
| 4,989,686 A | | 2/1991 | Miller et al. |
| 5,199,325 A | * | 4/1993 | Reuter et al. ............... 180/233 |
| 5,332,060 A | | 7/1994 | Sperduti et al. |
| 5,407,024 A | | 4/1995 | Watson et al. |
| 5,462,496 A | * | 10/1995 | Dick et al. .................. 180/248 |
| 5,655,618 A | | 8/1997 | Wilson et al. |
| 5,910,061 A | | 6/1999 | Organek et al. |
| 5,943,919 A | | 8/1999 | Babinski |
| 6,062,330 A | | 5/2000 | Watson et al. |
| 6,167,997 B1 | | 1/2001 | Keeney |

OTHER PUBLICATIONS www.powerjacks.com/ Duff–Norton / Ball Screw Actuators / pp. 1–6.

www.powerjacks.com / Duff–Norton / Ball Screw Actuators / pp. 1–2.

* cited by examiner

Primary Examiner—Saul Rodriguez
(74) Attorney, Agent, or Firm—Harness, Dickey & Pierce P.L.C.

(57) ABSTRACT

The present invention is directed to a power transfer system for a four-wheel drive vehicle equipped with a torque transfer coupling which includes a clutch pack and a ball-screw actuator. The ball-screw actuator functions to axially translates an apply plate to operatively engage the clutch pack and vary the frictional engagement. This arrangement yields numerous operational advantages over the prior art including, but not limited to, establishing a direct drive between the motor output shaft and the apply plate, concentric mounting of the actuator elements with the motor output shaft, and a simplified mechanical arrangement that reduces the number of frictional elements increasing operational efficiency and decreasing motor requirements.

5 Claims, 3 Drawing Sheets

TORQUE TRANSFER CLUTCH WITH BALL SCREW ACTUATOR

FIELD OF THE INVENTION

The present invention relates generally to power transfer systems for controlling the distribution of drive torque between front and rear wheels of a four-wheel drive vehicle and, more particularly, to a torque transfer coupling equipped with a ball-screw actuator.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical "mode" shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement.

Conventional clutch assemblies, typically include a clutch pack operably connected between a drive member and a driven member, and a power-operated actuator for controlling engagement of the clutch pack. Specifically, torque is transferred from the drive member to the driven member by actuating the power-operated actuator for displacing an apply plate which acts on the clutch pack and increases the friction of engagement between the interleaved plates.

A variety of power-operated actuators have been used in the art with mixed results. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, which includes a linear actuator that displaces a pivoting lever arm to increase the friction forces in the clutch pack. While the above actuator devices have performed generally adequately for their intended purpose, a need exists for an improved actuator that is less complex, reduces the number of friction generating components which lead to inefficiencies and larger motor requirements, and an annular arrangement that provides operational simplicity and reduced space requirements.

SUMMARY OF THE INVENTION

In view of the above, the present invention is directed to a power transfer system for a four-wheel drive vehicle wherein the torque transfer coupling includes a clutch pack and a ball-screw actuator. The ball-screw actuator functions to axially translates an apply plate to operatively engage the clutch pack and vary the frictional engagement. This arrangement yields numerous operational advantages over the prior art including, but not limited to, establishing a direct drive between the motor output shaft and the apply plate, concentric mounting of the actuator elements with the motor output shaft, and a simplified mechanical arrangement that reduces the number of frictional elements increasing operational efficiency and decreasing motor requirements.

Further areas of applicability of the present invention will become apparent from the detailed description provided hereinafter. However, it should be understood that the detailed description and specific examples, while indicating preferred embodiments of the invention, are intended for purposes of illustration only, since various changes and modifications within the spirit and scope of the invention will become apparent to those skilled in the art from the following detailed description, attached drawings and claims.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle. In operation, the amount of power (i.e., drive torque) transferred to the non-driven wheels is controllably regulated in accordance with various system and driver-initiated inputs for optimizing the tractive characteristics of the vehicle while concomitantly enhancing overall steering control. In addition, the power transfer system may also include a mode select mechanism for permitting a vehicle operator to select between a two-drive wheel mode, a part-time four-wheel drive mode, and an "on-demand" drive mode.

Figure 1:
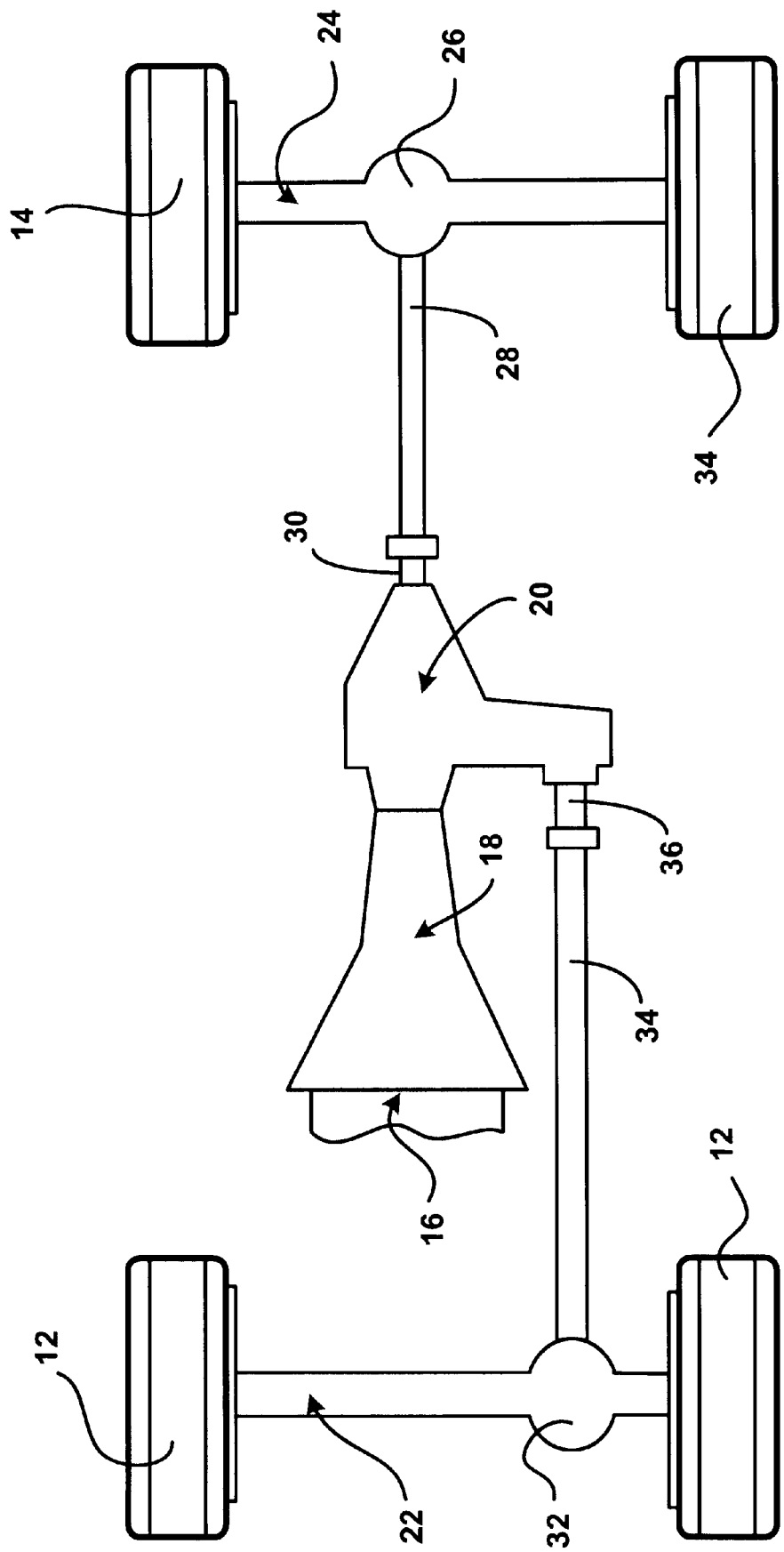
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a section output member 36 of transfer case 20. It is to be understood that the specific orientation of the drivetrain is merely exemplary in nature and that the drivetrain could be reversed for normally driving front wheels 12.

Transfer case 20 is equipped with a torque transfer clutch 38 for selectively delivering drive torque to front wheels 12 (i.e., the non-driven wheels) to establish a four-wheel drive mode of operation. The operating mode of transfer clutch 38 is generally controlled in response to a mode signal generated by a mode selector 40 and which is sent to a controller 42. Controller 42 also receives input signals from sensors 44 that are indicative of various operational characteristic of the vehicle.

When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated and maintained in a "lock-up" condition such that second output member 36 is, in effect, rigidly coupled for driven rotation with first output member 30. When the "on-demand" drive mode is selected, controller 42 controls the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated condition of transfer clutch 38 to provide superior handling and steering control by minimizing the oversteer and understeer tendencies of the vehicle during a cornering maneuver. Other advantages associated with controllably modulating the actuated state of transfer clutch 38 will be detailed hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

Transfer case 20 is shown to include a housing 56 formed by a series of modular sections that are suitably interconnected in a conventional manner. A transmission output shaft couples transmission 18 to an input shaft 60 of transfer case 20 for supplying power thereto. In the embodiment shown, first output member 30 includes an elongated mainshaft 62 which is aligned on the longitudinal axis of input shaft 60 and is supported for rotation within housing 56. For simplicity, the illustrated embodiment shows input shaft 60 extending as a mainshaft through the transfer case to form first output member 30. However, those skilled in the art will appreciate that a variety of intermediate sleeves or shafts splined to rotate with one another may be used to drivably couple a separate input shaft 60 for rotation with the output shaft 62. An exemplary illustration of such a shaft and sleeve arrangement is described in detail in U.S. Pat. No. 5,332,060 which is hereby expressly incorporated into this description by reference.

Figure 2:
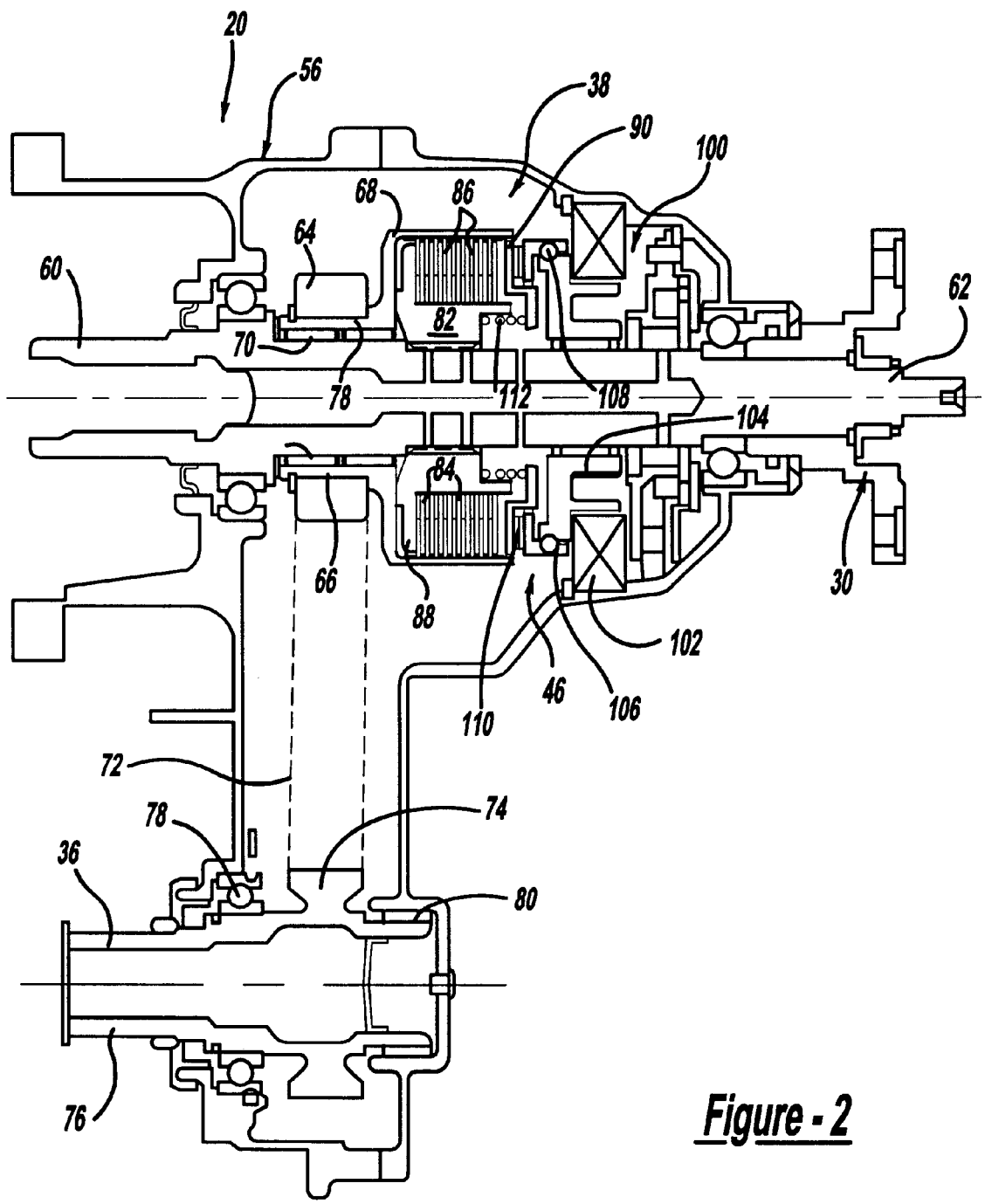
FIG. 2 is a cross-sectional view of a transfer case associated with the power transfer system and which includes a clutch assembly, a drive mechanism, and an electronically-controlled ball-screw actuator.
Figure 3:
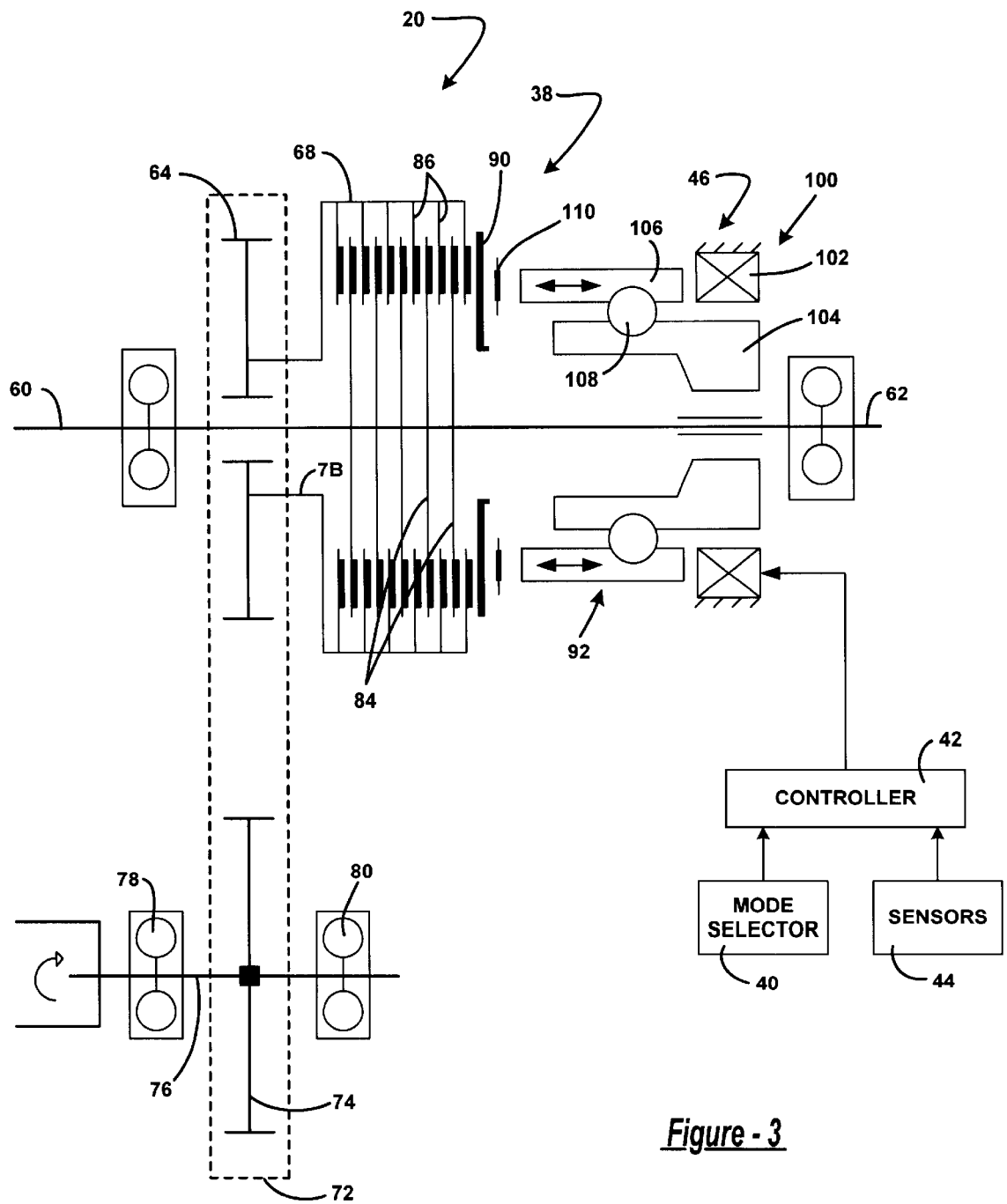
FIG. 3 is a schematic representation of the power transfer system including the clutch assembly and actuator.

With continued references to FIGS. 2 and 3, transfer clutch 38 is shown for transferring drive torque from input shaft 60 to front wheels 12. More specifically, a drive sprocket 64 is fixed (i.e., splined) for rotation on a tubular extension 78 of a rotatable cylindrical drum 68 associated with transfer clutch 38. In addition, extension 78 is rotatably supported on input shaft 60 by one or more suitable bearing assemblies 70. Drive sprocket 64 drivingly engages a chain 72 which is coupled to a lower driven sprocket 74. Driven sprocket 74 is coupled to, or an integral portion of, second output member 36 of transfer case 20. Second output member 36 is shown as a front output shaft 76 which is supported for rotation within housing 56 by suitable bearing assemblies 78 and 80. As noted, front output shaft 76 is operably connected to the motor vehicle's front wheel 12 via front drive shaft 34.

Transfer clutch 38 is a multi-plate clutch assembly that is arranged to concentrically surround a portion of input shaft 60. As noted, cylindrical drum 68 is fixedly secured to drive sprocket 64 so as to drive, or be driven by, front output shaft 76 of transfer case 20. In a preferred form, transfer clutch 38 also includes a clutch hub 82 that is concentrically surrounded by drum 68 and which is fixed (i.e., splined) to input shaft 60 for rotation therewith. Thus, clutch hub 82 and drum 68 are capable of rotating relative to one another and form an internal chamber therebetween. Disposed within the internal chamber are two sets of alternatively interleaved friction clutch plates that are operable for transferring torque from input shaft 60 through clutch hub 82 to drum 68 and, ultimately, to front output shaft 76 in response to a clutch "engagement" force applied thereto. One set of clutch plates, referred to as inner clutch plate 84, are mounted (i.e., splined) for rotation with clutch hub 82 while the second set of clutch plates, referred to as outer clutch plates 86, are mounted (i.e., splined) for rotation with drum 68. In addition, a reaction plate 88 is mounted on or integral with one end of clutch hub 82. In addition, an apply plate 90 is rotatable with clutch hub 68 and yet is axially movable with respect to interleaved friction clutch plates 84 and 86. Thus, apply plate 90 acts as a pressure plate for compressing the interleaved clutch so as to cause drive torque to be transferred through transfer clutch 38 as a function of the clutch engagement force exerted on apply plate 90 by a power-operated actuator 46.

Power-operated actuator 46 is a ball-screw actuator 92 which operatively engages apply plate 90 and is controlled by controller 42 to selectively control the amount of torque transferred through transfer clutch 38. Ball-screw actuator 92 provides a concentrically mounted actuator that reduces the mechanical and frictional components when compared to prior art actuators while further directly transferring rotational movement of the motor output to axial movement of apply plate 90 to provide more precise and repeatable and easily controlled reaction plate movement.

In general, ball-screw actuator 92 includes an electric motor 100 having a fixed stator 102 and a rotary output shaft 104, a screw 106, and a plurality of circumferentially spaced balls 108. Electric motor 100, screw 106, and balls 108 are each concentrically mounted with one another and about output shaft 62. Screw 106 is mounted within housing 56 for axial, non-rotational movement relative thereto. A thrust bearing 110 is disposed between the application face surfaces of screw 106 and apply plate 90 to permit rotation of apply plate 90 relative to screw 106. A spring 112 is located between hub 82 and apply plate 90 for normally exerting a return biasing a force on apply plate 90.

In operation, controller 42 selectively delivers current to electric motor 100 which causes motor 100 to rotate its output shaft 104. Motor output shaft 104 has helical grooves formed on its outer circumferential surface while screw 106 has helical grooves formed on its inner circumferential surface. Balls 108 are disposed within the grooves causing axial displacement of lead screw 106 toward or away from apply plate 90 in response to direction of rotation of motor output shaft 104. In turn, axial displacement of lead screw 106 causes corresponding movement of apply plate 90 and the desired increase or decrease in the frictional engagement between interleaved clutch plates 84 and 86. Thus, control of the direction and amount of rotation of shaft 104 controls the magnitude of the clutch engagement force exerted on clutch assembly 38.

In view of the above arrangement, electric motor output shaft 104 acts as the input to the ball-screw yielding a mechanically simple system that eliminates more complex mechanical designs generally used in the art that include a plurality of gears and/or linkages. As each of the mechanical components of the actuator contain friction elements, the elimination of these components and the more simple design provided by the present invention reduces the overall friction and therefore increases the efficiency of the assembly. Increased efficiency is translated into more economical motors and more accurate clutch torque estimation. The novel annular packaging of the motor and ball-screw actuator permits the outer diameter of motor 100 to be grounded to housing 56. Those skilled in the art will appreciate that a variety of electric motors may be used including a dc brush, dc brushless, and stepper motors.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A power transfer system for a motor vehicle having an engine and first and second sets of wheels, comprising:
    a transfer mechanism for transmitting drive torque from the engine to the first set of wheels and selectively transmitting drive torque to the second set of wheels through a transfer clutch capable of varying the torque transmitted therethrough by varying a clutch engagement force;
    an apply plate that is movable relative to said transfer clutch between a first position for generating a minimum clutch engagement force and a second position for generating maximum clutch engagement force;
    a ball screw actuator having an electric motor, a lead screw and a plurality of balls, said electric motor having an output shaft with a helical groove formed on an outer surface of said output shaft, said lead screw having an internal circumferential surface and a helical groove formed thereon, said plurality of balls being positioned within said helical grooves between said output shaft and said lead screw wherein rotation of said output shaft axially displaces said lead screw to act on said apply plate for producing a linearly directed output force in response to control signals, said linearly directed output force being exerted on said apply plate to move said apply plate between its first and second positions; and
    a controller for generating said control signals.

2. The power transfer system of claim 1 wherein said electric motor is mounted concentrically about an output shaft of said transfer mechanism.

3. The power transfer system of claim 2 wherein said lead screw is annularly aligned with said electric motor.

4. The power transfer system of claim 1 wherein said transfer mechanism includes a first member driven by the engine, and a second member coupled to the second set of wheels, and wherein said transfer clutch is a clutch pack that includes first plates fixed to said first member and second plates fixed to said second member, said first and second plates interleaved to form said clutch pack.

5. A power transfer system comprising:
    an input shaft;
    an output shaft; and
    a transfer clutch having a first clutch plate fixed for movement with said input shaft and a second clutch plate fixed for movement with said output shaft, and a ball screw actuator having an electric motor with a threaded rotary member, said ball screw actuator further having a threaded linearly moveable member, and balls dispersed between said threads, said linearly moveable member acting on said first and second clutch plates for producing a linearly directed output force that is exerted thereon in response to rotation of said rotary member.

* * * * *